United States Patent
Ramsey, Jr.

[11] 3,828,126
[45] Aug. 6, 1974

[54] REAL TIME INTERFEROMETRY

[75] Inventor: S. David Ramsey, Jr., Palo Alto, Calif.

[73] Assignee: American Express Investment Management Company, San Francisco, Calif.

[22] Filed: Apr. 13, 1973

[21] Appl. No.: 351,077

[52] U.S. Cl......... 178/6.8, 73/67.5 H, 178/DIG. 36, 350/3.5, 356/109
[51] Int. Cl........ G01b 9/02, H04n 5/76, H04n 7/18
[58] Field of Search ....... 178/6.8, DIG. 36; 350/3.5; 73/67.5 H; 356/109

[56] References Cited
UNITED STATES PATENTS

| | | | |
|---|---|---|---|
| 3,503,037 | 3/1970 | Smith | 73/67.5 H |
| 3,649,754 | 3/1972 | Macovski | 178/6.8 |
| 3,735,036 | 5/1973 | Macovski | 178/6.8 |

Primary Examiner—Howard W. Britton
Attorney, Agent, or Firm—Townsend and Townsend

[57] ABSTRACT

A real time holographic interferometer for measuring deformation of objects. Four independent holographic interference patterns are formed with on-axis object and reference beams. The first two interference patterns are of the object in a first physical state, e.g., in its first state of stress, or of a reference plane, and the second two interference patterns are of the object in a second physical state, e.g., in its second state of stress. The phase of the reference beam is shifted 90° for each exposure. A storage-type television camera is employed for generating output signals that contain information from the four interference patterns. The first three output signals of the camera are stored in video recorders and are retrieved synchronously with the fourth camera output signals. Two signal pairs each consisting of a signal of the first and second states of stress of the object are combined and subtracted to form difference signals which are thereafter electronically squared and summed to generate a processed signal that contains the desired deformation information. The processed signal is utilized such as for driving a cathode ray tube.

40 Claims, 3 Drawing Figures

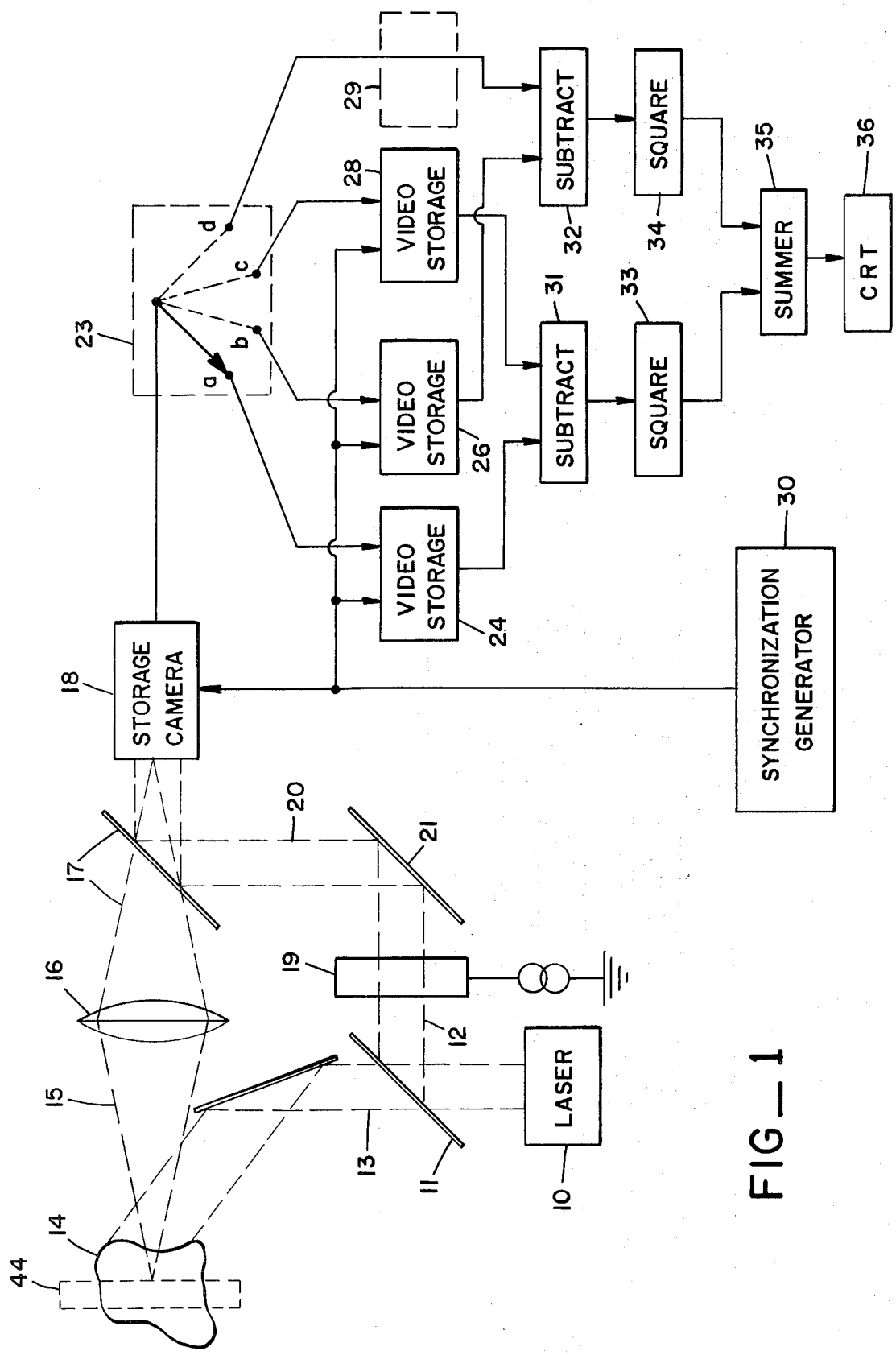
FIG_1

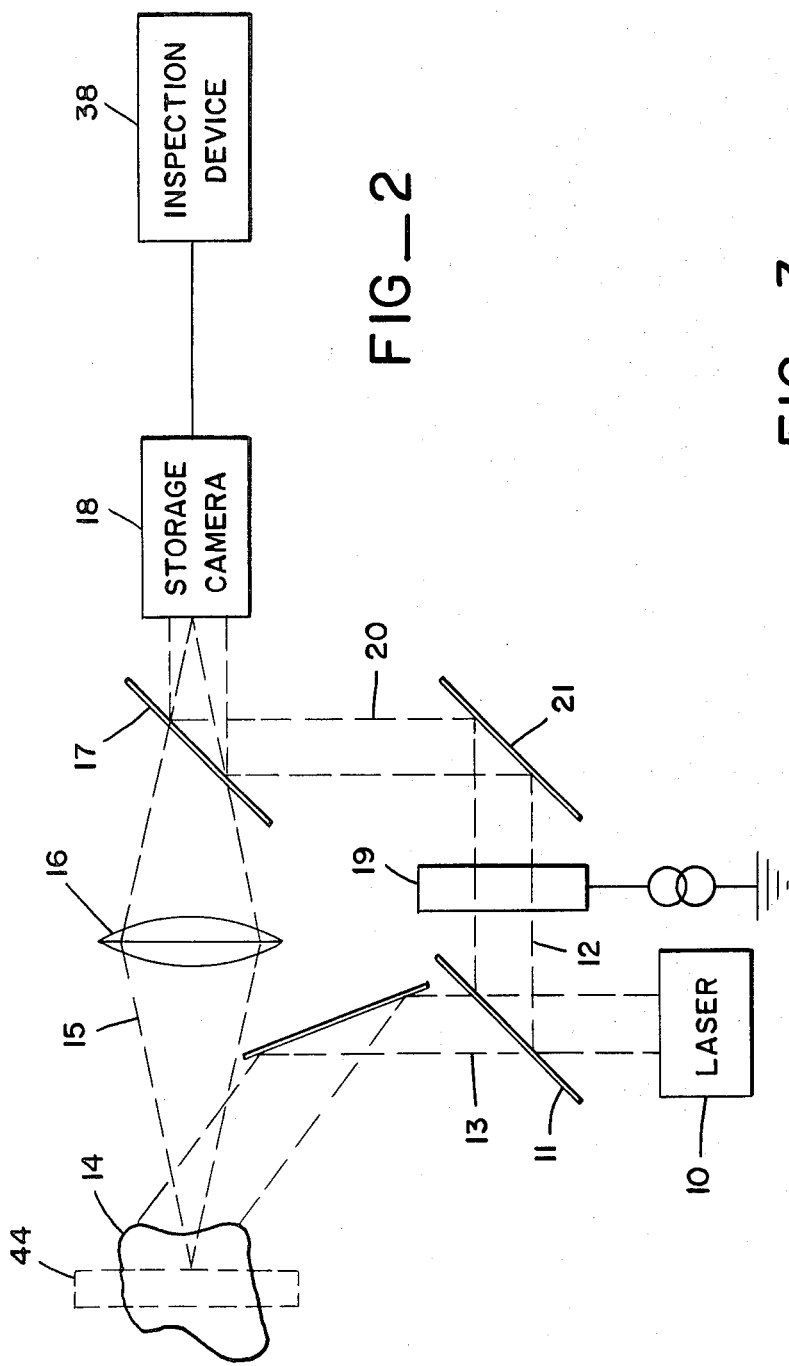
FIG_2
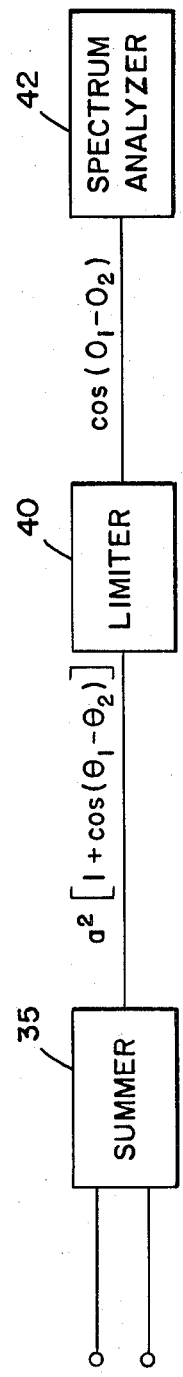
FIG_3

REAL TIME INTERFEROMETRY

BACKGROUND OF THE INVENTION

This application is related to and uses some of the techniques described in the commonly owned U.S. Pat. No. 3,649,754 for "Real Time Interferometry Utilizing a Television System" and in the commonly owned copending patent application Ser. No. 84,031 filed Oct. 26, 1970 entitled "Real Time Interferometry Contour Mapping System," now U.S. Pat. No. 3,735,036.

This invention relates to hologram interferometry and more particularly to real time hologram interferometry for measuring small dimensional changes in an object.

A holographic system is one wherein light diffracted by an object or reflected by an object is presented with a reference wave to produce a complex light interference pattern that contains information about both the amplitude and phase of the light diffracted or reflected from the object. The interference pattern may be recorded for example on photographic film which may respond only to intensity and the recorded interference pattern is called a hologram. By directing light having a frequency content substantially corresponding to that of the light diffracted or reflected by the original object through the recorded interference pattern, an image of the original object can be obtained.

The earliest means of recording and reconstructing holograms were called on-axis systems and had the advantage that the photographic film used to record the information about the amplitude and phase of the diffracted waves could be a low resolution film. However, this early system had the disadvantage that it was extremely difficult to separate the desired image from interfering light and other images in the reconstructed wave.

In an effort to separate meaningful images from background noise in a holographic system an off-axis system was developed. In this system the recording plane received light from the object and the reference waves from different locations. The frequency of the interference fringes which must be recorded on the hologram is increased as a function of the angle between the interfering waves. Thus, it is necessary to utilize a recording medium (photographic film, for example) which has a much higher resolution than is necessary to make the same recording using an on-axis holographic system.

This type of holography has been applied in hologram interferometry for measuring small dimensional changes in an object as, for example, when searching for defects in automobile tires. A first hologram is made of the object, such as the tire. The object is then altered or stressed in some specific way; for example, the tire pressure is increased. A second hologram is then made of the object in a different stress condition, and the first and second holograms are superimposed. The interference fringes in the final reconstruction of the developed hologram transparency indicate the amount of movement which has taken place in each area. In the case of the tire, excessive fringes in a local area is indicative of a defect. This method of hologram interferometry, however, requires the awkward wet processing of photographic film. In addition, very high resolution emulsions are required since, as in conventional holography, the reference is introduced at an angle in order to eliminate undesired components.

In U.S. Pat. No. 3,649,754, referred to above, these disadvantages are overcome in a real time interferometry system which enables real time display of defects in an object under stress. In accordance with the patent disclosure two interference patterns of an object, one without stressing of the object and one with such stressing, are produced. In one approach the interference patterns are generated with an object light beam and an "on-axis" reference light beam (with a temporal offset) which form visual inputs for an image dissector which in turn converts the inputs into electrical output signals. In another approach the interference patterns are generated with "off-axis" object and reference beams and form the visual input to a television storage camera which in turn converts the inputs into electrical signals. The output signals are then employed to produce signals which contain information relative to position deformities of the object between the two different states of stress. The information in the position deformity signals is then displayed on an appropriate display device such as a conventional cathode ray tube (CRT) for viewing by an operator or employed in an appropriate automatic defect recognition apparatus.

The U.S. Pat. No. 3,649,754 also discloses a somewhat simplified form of its holographic interferometer (see FIG. 6 of the patent) which is not equipped to reproduce an image of the object but only to generally indicate where the object exhibits a defect. Such a system is sometimes sufficient for automatic defect recognition purposes to provide a pass or no pass signal for use, for example, in accepting or rejecting products on an assembly line. The simplified approach employs "on-axis" object and reference beams without a temporal or spatial offset of the reference beam. This approach has the apparent disadvantage that it can only function as a "go, no-go device" and that is unable to reproduce the original image.

U.S. Pat. application Ser. No. 84,031, now U.S. Pat. No. 3,735,036, referred to above, is similar to the U.S. Pat. No. 3,649,754 as far as its supporting hardware and electronic circuitry is concerned but differs in one essential respect. Instead of generating two interference patterns of the object, in two different states of stress, only one interference pattern of the object is formed while the second interference pattern is that of a reference plane or other standard surface. These interference patterns again form visual inputs to an image dissector or storage-type television camera and they are again generated with on-axis or off-axis object and reference beams as above described. The system can also operate in the simplified form to produce go or no-go output signals only.

The first output signals (interference pattern of the object in the first state of stress) from the image dissector or the storage camera are then stored in a video recorder, combined with the second output signals (interference pattern of the object in the second state of stress) and envelope detected with the detected signal being displayed on the CRT.

SUMMARY OF THE INVENTION

The present invention relates to real time interferometry employing a storage-type television camera tube such as a vidicon or orthicon tube but without requiring a spatially offset (off-axis) reference beam while assuring a high quality image reproduction. Thus, the present invention enables the utilization of storage camera tubes which have a significantly better light sensitivity than image dissector camera tubes. Consequently, the present invention is a substantial improvement over the prior art combining the advantages of on-axis holography with those derived from the use of high light sensitivity storage-type television camera tubes.

The present invention further yields increased resolution for the interferometer. In off-axis holography, such as disclosed in the U.S. Pat. No. 3,649,754, the angle between the object and reference beams is used to place the desired information on a spatial carrier. It therefore limits the amount of bandwidth available for the desired information because the storage camera has a limited spatial resolution. By eliminating the off-set reference light beam angle the entire camera bandwidth can be allocated to the desired information thereby resulting in an increased resolution.

Thus, the present invention reduces the resolution requirements for the camera and recorder for a given video bandwidth. Alternatively, it allows the video bandwidth to be larger for a given camera resolution.

In accordance with the present invention a high quality read-out, e.g., the reproduction of the object image on the CRT, is possible by generating four sequential exposures of the storage camera. Two of the exposures are of the object in a first physical sate, e.g., a first state of stress or at a first temperature, and the other two are of the object in a second, different physical state, e.g., in a higher or lower state of stress or at a different temperature. If the object under investigation is defective the surface around the defective area deforms nonuniformly and can be observed and judged defective or acceptable.

Broadly speaking, this is accomplished by generating four independent interference patterns. The first interference pattern is formed by the object beam scattered and reflected by the object in the first state of stress, say its unstressed state (or the reference plane), and the reference beam. This first pattern forms the visual input for the storage-type camera and is converted into a first electric output signal that is stored in a first video storage device. The optical phase of the reference beam is now shifted by 90° ($\pi/2$) to form a second interference pattern of the object in the first state and the phase shifted reference beam, resulting in second output signals stored in a second video storage device. Thereafter, an interference pattern of the object beam scattered and reflected by the object in its second state of stress, say its stressed state, is generated with a third reference beam having its phase shifted 90° ($\pi$), resulting in third camera output signals that are stored in a third video storage device. The fourth and final interference pattern is generated from the object beam scattered and reflected by the object in its second state and the reference beam having its phase shifted by 270° ($4\pi/3$). As the camera generated the fourth output signals the stored signals are synchronously retrieved from the storage devices for generating difference signals, which are then squared, summed and displayed on a suitable display device such as a CRT. If desired the fourth signal may also be stored on a video storage device for subsequent playback. Such an arrangement is particularly useful in a continually updated system in which the last two exposures of a cycle or measurement (i.e., the third and fourth exposures) become the first two exposures (i.e., the first and second exposures) of the next cycle.

The display obtained from these four exposures is a real image of the object modulated by a set of fringes which indicate the defect in the object. Thus, unlike the interferometers disclosed in the above-referenced patent and patent application the present invention provides not only a go, no-go signal but an original image of the object for full inspection while the shortcomings inherent in the use of image dissectors or off-axis holography are eliminated. Thus, the usefulness of real time interferometry is thereby substantially enhanced.

BRIEF DESCRIPTION OF THE DRAWINGS

FIG. 1 schematically illustrates one embodiment of a hologram real time interferometer constructed in accordance with the present invention employing both on-axis object and reference beams and a storage-type television camera tube;

FIG. 2 is a schematic illustration similar to FIG. 1 and shows the manner in which the present invention is combined with automatic inspecting equipment; and FIG. 3 shows in greater detail an automatic defect recognition device for use with the interferometer illustrated in FIG. 1.

DESCRIPTION OF THE PREFERRED EMBODIMENTS

Referring now to FIG. 1, light from a continuous or pulsed laser 10 is split by a half-silvered mirror 11 into an object beam 13 and a reference beam 12. The object beam 13 illuminates an object 14 which is being inspected and the object 14 scatters and reflects the object beam 13 to form a scattered object beam 15. The scattered object beam 15 is focused by a lens 16 through a half-silvered mirror 17 onto the face of a storage-type television camera tube 18 such as a conventional vidicon or orthicon tube.

A light phase shifter such as an electro-optic crystal 19 is inserted in the path of the reference beam 12 so that a voltage $V$ can vary or shift the optical phase of reference beam 12 by a predetermined amount $\phi$. The phase shifted reference beam 20 is recombined with light from the scattered and reflected object beam 15 by an arrangement of mirrors. That is, a mirror 21 is positioned in the path of the shifted reference beam 20 at an angle of 45° relative to its axis (parallel to the plane of beam splitter 11) thus reflecting the modulated reference beam 20 at an angle of 90° (upward in the drawing) to the beam splitter 17 placed at a 45° angle to the path of the shifted reference beam 20 (parallel to both beam splitter 11 and mirror 21) in such a manner that it colinearly or concentrically combines the reference beam 20 and the scattered and reflected object beam 15. The final mirror for combining the two beams is a beam splitter because the modulated reference beam 20 must be brought to the face of the storage camera 18 on-axis with the center of the scattered and reflected object beam 15 in order to form the desired interference pattern. The on-axis arrangement effectively minimizes spatial frequencies at the interference plane or face of the storage camera 18.

The interference between the scattered and reflected object beam 15 (with the object being in its first state of stress, e.g., its unstressed or normal state of stress, and the reference beam 20 ($e^{j\phi_i}$) are applied to the storage tube 18 for scanning and conversion into an electrical signal. $\phi_i$ is the phase of the $i$ th exposure as determined by the phase shifter. For the first exposure the reference beam phase is arbitrarily called zero radians, that is $\phi_1 = $ zero.

The field distribution of the light gathered from the object is given by $$U_1(x,y) = a_1(x,y)e^{j\theta_1 \,(x,y)}$$

and the field distribution of the reference beam is given by $$R_i(x,y) = e^{j\phi_1}$$

Thus, the intensity of the two beams in the interference pattern at the face of the storage tube 18 is given by $$I_1(x,y) = |U_1(x,y) + R_1(x,y)|^2 = |a_1(x,y)e^{j\theta_1 \,(x,y)} + 1|^2 = a_1^2 + 1 + 2a_1\cos\theta_1.$$

This intensity is scanned by the camera tube, converted into a first electrical output signal, and applied through a switch 23 to a first video storage device or recorder 24 by setting the switch as shown in FIG. 1, that is by closing switch terminal.

After $I_1$ has been recorded, the phase of the reference beam is shifted so that $\phi_2 = \pi/2$ and $R_2 = e^{j\pi/2} = j$. In the second exposure object 14 remains in its first state of stress and a second image is generated at the camera having a total intensity given by $$I_2 = |a_1 e^{j\theta_1} + j|^2 = a_1^2 + 1 + 2a_1\sin\theta_1.$$

$I_2$ is recorded on a second video recorder 26 in the above-described manner by closing contact $b$ of switch 23.

Two additional exposures are now taken with object 14 in its second state of stress, e.g., its stressed or distorted state. For example, if the object were a tire the pressure could be increased. The third exposure is taken with $\phi_3 = \pi$, while the image intensity or field distribution of the stressed image at the storage camera is given by $$U_2(x,y) = a_2(x,y)e^{j\theta_2}$$

The total image intensity at the camera is now given by $$I_3 = a_2^2 + 1 - 2a_2\cos\theta_2.$$

$I_3$ is recorded on a third video recorder 28 in the above-described manner by closing contact $c$ of switch 23.

The fourth exposure taken is a second exposure of the object in its second state of stress and is taken after the phase of reference beam 20 has been shifted so that $\phi_4 = 3\pi/2$, yielding a total image intensity at the storage camera given by $$I_4 = a_2 + 1 - 2a_2\sin\theta_2.$$

As $I_4$ is scanned by the camera the stored signals $I_1$, $I_2$, and $I_3$ are retrieved from video storages 24-28 in synchronism with the scanning of the fourth image by utilizing a synchronization signal provided by a synch generator 30. The retrieved signals $I_1$ and $I_3$ are applied to a first electronic subtractor 31 and the retrieved signal $I_2$ and the scanned signal $I_4$ are applied to a second electronic subtractor 32 for the formation of difference signals $I_1 - I_3$ and $I_2 - I_4$, which are then applied to squaring circuits 33 and 34, respectively. The squared signals are added in a summer 35 to form a processed signal $J$ which is displayed on a display device such as CRT 36.

As mentioned above, if desired the fourth signal can also be stored on a video storage device 29 (shown in phantom lines) for subsequent use.

In general, the changes in the object 14 due to being stressed or altered will be very small in size so that the amplitude of the image in each case, $a_1$ and $a_2$, will be essentially the same. The only significant change takes place in the phase $$\theta_1 - \theta_2 = \Delta\theta = k\Delta z$$

where $k$ is the wave number $2\pi/\lambda$ and $\Delta z$ is the deformation change of the object. Thus, for purposes of simplifying the mathematics involved, it can be said that $a_1 = a_2 = a$. It should be noted that this assumption is not essential. The analysis would be equally valid if it were not made and it is made only to simplify the mathematics involved. The processed signal $J$ is then given by $$J = |I_1 - I_3|^2 + |I_2 - I_4|^2 = |2a(\cos\theta_1 + \cos\theta_2)|^2 + |2a(\sin\theta_1 + \sin\theta_2)|^2 = 4a^2[(\cos^2\theta_1 + \sin^2\theta_1) + (\cos^2\theta_2 + \sin^2\theta_2) + (2\cos\theta_1\cos\theta_2 + 2\sin\theta_1\sin\theta_2)] = 4a^2[2 + 2\cos(\theta_1 - \theta_2)].$$

Thus, the display output, neglecting the multiplicative constant, is $$J = a^2[1 + \cos k\Delta z].$$

This is an image of the object $a^2$ with a set of fringes superimposed on it according to the deformation change $\Delta z$.

The system can be used for assembly line testing of a wide variety of products and any defects in the product show up as excessive fringes or interference in a local area on the cathode ray tube 36. The CRT displays the original image of the object together with the set of modulating fringes to indicate areas of excess stress, distortion and the like.

Referring briefly to FIGS. 2 and 3, the inspection of the interference patterns between the two different signals may be made manually, as above described, on a CRT or automatically, in which case an inspection device 38 is provided which may comprise a limiter 40 to which the output of summer 35 is applied, and a spectrum analyzer 42 for indicating the degree of deformation.

The limiter removes all of the signal information except for $\cos(\theta_1 - \theta_2)$ for analyzation of this term by the spectrum analyzer. Since, when storage camera 18 is scanned the pattern will disappear in a few frames the inspection must be made within these few frames. If subsequent inspection is desired, the inspection device 38 may be provided with a suitable storage device such as a video disc or storage tube so that the scanned signal can be stored for subsequent use.

For automatically measuring the deformation of the stressed object it may be helpful at times to scan in both the $x$ and the $y$ direction. However, for local deformations which produce circular interference patterns, a one-dimensional scan as provided by a conventional raster is sufficient. In a production line setting, equipment for automatically accepting or rejecting products (not separately shown or described herein) can be controlled by spectrum analyzer 42. Thus, when the degree of deformation of a stressed product is beyond a certain limit, indicating a defect, the product can be automatically rejected and removed from the assembly line.

The present invention is also adapted for contour mapping or interferometry employing a reference plane as disclosed in the above-referenced copending patent application, now U.S. Pat. No. 3,735,036. Referring again to FIG. 1, the optical arrangement remains the same as for interferometry employing the object in its stressed and unstressed states. The interference patterns from the scattered and reflected object beam 15 and the modulated reference beam 20 ($e^{j\phi_1}$) are applied to the storage camera 18 which measures the intensity. To provide contour mapping of the surface height variations of the object in the direction of the optical axis of the lens 16, a standard reference plane such as a flat white surface 44 (shown in dotted lines) is first used. The standard flat surface 9 is illuminated by object beam 13 to form the reflected object beam 15.

The field distribution of the light scattered from the standard reference plane, which is uniformly reflecting so that $a \approx 1$, is given by $$U = e^{j\phi_1(x,y)}$$

and the field distribution of the reference wave may be expressed as $$R_1 = e^{j\phi_1}$$

The storage camera generates two output signals of the reference plane and two output signals of the object as above described. The reference surface signals ($I_1$ and $I_2$) and the first object signal ($I_3$) are stored in video recorders 24–26 and retrieved synchronously with the scanning of the fourth image ($I_4$) to form the earlier described difference signals in subtractors 31 and 32 which, thereafter, are squared in squaring circuits 33 and 34. In this case, the amplitude of the reference surface is $a = 1$ and its phase is given by $$\theta_1 = 2\pi z_1/\lambda$$

where $z_1$ is a constant. Similarly, the phase of the object is given by $$\theta_2 = 2\pi z_2(x,y)/\lambda$$

where $z_2(x,y)$ is the contour information. The processed signal $J$ is then given by $$|J = \{1 + \cos^i 2\pi/\lambda)\, [z_2(x,y) - z_1]\}.$$

The reference flat may be defined as $z_1 = 0$ so that $$|J = \{1 + \cos^i 2\pi/\lambda)\, [z_2(x,y)]\}$$

and the contour fringes of the object may be displayed on the CRT 36. In all other respects this embodiment of the invention, employing a reference plane rather than an unstressed or "normal" reference object operates as above described and may incorporate automatic detection equipment and techniques in the above-described manner.

It will be apparent that even though the reference surface is illustrated to be a plane surface a variety of standard reference surfaces can be used. Thus, a smooth curved surface or a surface with some standard configuration could be used for the reference surface. In addition to contour mapping the present invention is also applicable for comparing an object surface with a standard reference surface of one form or another to determine the extent of deviation of the object surface from the standard surface. In this respect, the invention is also applicable for monitoring object surface configurations with respect to standard surface configurations for quality control.

I claim:

1. Apparatus for measuring small dimensional changes in an object by real time hologram interferometry comprising:
   means for sequentially illuminating a surface of a first object at least twice to form first and second scattered and reflected object beams respectively;
   means for sequentially illuminating a surface of a second object at least twice to sequentially form third and fourth scattered and reflected object beams;
   means for generating a reference light beam;
   means for shifting the phase of the reference light beam by equal increments to form a number of phase shifted reference beams equal to the number of object beams;
   means for sequentially combining the first through fourth scattered and reflected object beams with the phase shifted reference light beams to form individual first through fourth interference patterns;
   a storage-type television camera tube having a visual input and for converting the visual input to an electrical output positioned to receive as an input said interference patterns and to generate therefrom first through fourth electrical output signals;
   means for storing at least the first three electrical output signals of the television camera tube;
   means for combining the first through fourth electrical output signals of the television camera tube to form a processed signal containing position deformation information of the first and second object surfaces; and
   means for utilizing the processed signal containing position deformation information.

2. Apparatus according to claim 1 wherein the means for phase shifting comprises an electro-optic crystal through which the reference beam is passed, and including means for varying the voltage applied to the crystal to thereby shift the phase of the reference beam.

3. Apparatus according to claim 1 including means for storing the fourth electrical output signal from the television camera tube.

4. Apparatus according to claim 1 wherein the first and second objects comprise identical articles in first and second states.

5. Apparatus according to claim 4 wherein the article in the first state is in a state of relatively lesser stress and the article in the second state is in a state of relatively greater stress.

6. Apparatus according to claim 1 wherein the phase shifting means comprises means for shifting the phase by a factor $2\pi$ divided by the number of generated object beams.

7. Apparatus according to claim 6 wherein the factor is $\pi/2$.

8. Apparatus according to claim 1 wherein the storing means comprises a video signal recorder for each storage camera output signal but the last output signal, and including means for retrieving the stored output signals in synchronism with the generation of the last output signal.

9. Apparatus according to claim 8 wherein the means for applying the signals comprises a synch generator.

10. Apparatus according to claim 1 wherein the means for utilizing the signal containing position deformation information comprises a limiter for removing original picture information and a spectrum analyzer for analyzing the remaining position deformation information.

11. Apparatus according to claim 10 wherein the combining means comprises means for subtracting said signals from each other to form difference signals, means for electronically squaring the difference signals, and means for adding the squared difference signals to thereby generate the processed signal.

12. Apparatus according to claim 1 wherein the surface of the first article comprises a reference surface.

13. Apparatus according to claim 12 wherein the reference surface is a flat surface.

14. Apparatus according to claim 12 wherein the reference surface is a regular surface different from the surface of the second object.

15. Apparatus according to claim 1 wherein the combining means comprises means for generating electric difference signals between the third and the first interference patterns and between the fourth and the second interference patterns.

16. Apparatus according to claim 15 including electronic means for squaring the difference signals.

17. Apparatus according to claim 16 including electronic summer means for adding the squared signals and thereby generating the processed signal.

18. Apparatus according to claim 17 wherein the utilizing means comprises a cathode ray tube for visual inspection.

19. Apparatus for measuring small dimensional changes in an object by real time hologram interferometry comprising:
   a. means for sequentially illuminating an object twice each in first and second states to form two first and two second scattered and reflected object beams, respectively;
   b. means for generating a reference light beam;
   c. phase shifting means for sequentially changing the phase of the reference beam by 90°;
   d. a storage television camera tube having a visual input and adapted to convert visual information to an electrical output;
   e. means for sequentially combining the four scattered and reflected object beams with the four phase shifted reference beams to form first through fourth individual interference patterns, respectively, the interference patterns each being stored as a visual input by the storage television camera tube;
   f. means for scanning the storage television camera tube sequentially producing four output signals of the four interference patterns;
   g. means for storing the first three of the four output signals;
   h. means for processing the four output signals into a processed signal containing image information of the object and position deformation information about the objects between their two states, the processing means including means for combining output signals from interference patterns of the object in one state with output signals from interference patterns of the object in its other state; and
   i. inspecting means inspecting the processed signal to derive position deformation information about the object therefrom.

20. Apparatus for measuring small dimension surface height contours of an object by real time hologram interferometry comprising:
   means for illuminating a standard reference surface at least twice to form first and second scattered and reflected object beams anf for illuminating the object whose surface height contours are to be measured at least twice to form third and fourth scattered and reflected object beams;
   means for generating a reference light beam;
   means for changing the reference light beam into at least four phase shifted reference light beams, each such phase shifted reference light beam having its phase shifted by equal increments to form a number of phase shifted reference beams equal to the number of object beams;
   a storage television camera tube for receiving a visual input and for converting the visual input to an electrical output;
   means for combining the first and second object beams scattered and reflected from the standard reference surface with the first two phase shifted reference light beams to form first and second interference patterns which are received by the storage camera tube, and for combining the third and fourth object beams scattered and reflected from the object surface with the third and fourth phase shifted reference light beams to form third and fourth interference patterns which are received by the storage camera tube;
   means for storing at least the first three output signals of the storage tube corresponding to the first three interference patterns;
   means for synchronously combining the output signals from the reference surface interference patterns with the output signals of the object surface interference patterns; and
   means for generating from the combined signals processed signals containing surface position height information about the object surface relative to the standard surface.

21. Apparatus according to claim 20 wherein the standard surface is a plane surface.

22. Apparatus according to claim 20 wherein the standard surface comprises a smooth regular surface.

23. Apparatus according to claim 20 wherein the standard surface comprises a curved surface.

24. Apparatus according to claim 20 including means for utilizing the signal containing position height information.

25. Apparatus according to claim 24 wherein the utilizing means comprises a cathode ray tube.

26. A method for measuring small dimension surface height contours on an object by real time hologram interferometry comprising:
   illuminating a standard reference surface to form a first scattered and reflected object beam;
   generating a first reference light beam;
   combining the first object beam with the first reference light beam to form a first interference pattern and projecting the first interference pattern on a storage television camera tube as a visual input;

storing the resulting first electrical output of the television tube;
generating a second reference light beam having a 90° phase shift with respect to the first light beam;
combining the first object beam with the second reference light beam to form a second interference pattern and projecting the second interference pattern on the storage television camera tube as a visual input;
storing the resulting second electrical output of the television camera tube;
illuminating the object whose surface contours are to be measured to form a second scattered and reflected object beam;
generating a third reference light beam having a 180° phase shift relative to the first light beam;
combining the second object beam with the third reference light beam to form a third interference pattern and projecting the third interference pattern on the storage television camera tube as a visual input;
storing the resulting third electrical output of the television camera;
generating a fourth reference light beam having a phase shift relative to the first reference light beam of 270°;
combining the second scattered and reflected object beam with the fourth reference light beam to form a fourth interference pattern and projecting the fourth interference pattern on the storage television camera tube as a visual input;
retrieving the stored first through third electrical outputs in synchronism with the generation of the fourth electrical output of the storage television camera tube;
combining the third and fourth output signals with the first and second output signals; and
generating therefrom a processed signal containing surface position height information about the object surface relative to the standard surface.

27. A method according to claim 26 wherein the step of combining comprises the step of forming difference signals by subtracting the first and second output signals from the third and fourth output signals.

28. A method according to claim 27 wherein the step of generating the processed signal comprises the steps of electronically squaring the difference signals and thereafter electronically summing the squared difference signals.

29. A method according to claim 26 including the step of utilizing the processed output signal.

30. A method according to claim 29 wherein the step of utilizing comprises the step of forming a display of the object and surface position height information on a cathode ray tube, and visually observing the display.

31. A method according to claim 29 wherein the step of utilizing comprises the step of driving with the processed signal an automatic object reject-acceptance device.

32. A method for measuring small dimension changes in an object by real time hologram interferometry comprising:
illuminating the object in a first state to form a first scattered and reflected object beam;
generating a first reference light beam;
combining the first object beam with the first reference light beam to form a first interference pattern and projecting the first interference pattern on a storage television camera tube as a visual input;
storing the resulting first electrical output of the television tube;
generating a second reference light beam having a 90° phase shift with respect to the first light beam;
combining the first object beam with the second reference light beam to form a second interference pattern and projecting the second interference pattern on the storage television camera tube as a visual input;
storing the resulting second electrical output of the television camera tube;
illuminating the object in a second state to form a second scattered and reflected object beam;
generating a third reference light beam having a 180° phase shift relative to the first light beam;
combining the second object beam with the third reference light beam to form a third interference pattern and projecting the third interference pattern on the storage television camera tube as a visual input;
storing the resulting third electrical output of the television camera;
generating a fourth reference light beam having a phase shift relative to the first reference light beam of 270°;
combining the second scattered and reflected object beam with the fourth reference light beam to form a fourth interference pattern and projecting the fourth interference pattern on the storage television camera tube as a visual input;
retrieving the stored first through third electrical outputs in synchronism with the generation of the fourth electrical output of the storage television camera tube;
combining the third and fourth output signals with the first and second output signals; and
generating therefrom a processed signal containing position deformation information of the object in its two states.

33. A method according to claim 32 wherein the step of combining comprises the step of forming difference signals by subtracting the first and second output signals from the third and fourth output signals.

34. A method according to claim 33 wherein the step of generating the processed signal comprises the steps of electronically squaring the difference signals and thereafter electronically summing the squared difference signals.

35. A method according to claim 32 including the step of utilizing the processed output signal.

36. A method according to claim 35 wherein the step of utilizing comprises the step of forming a display of the object and surface position height information on a cathode ray tube, and visually observing the display.

37. A method according to claim 35 wherein the step of utilizing comprises the step of driving with the processed signal an automatic object reject-acceptance device.

38. A method according to claim 32 including the step of transforming the object between the two states.

39. A method according to claim 38 wherein the transforming step comprises the step of changing the relative stress to which the object is subjected.

40. A method according to claim 38 wherein the transforming step comprises the step of changing the relative temperature of the object.

* * * * *